United States Patent
Celozzi et al.

(10) Patent No.: US 10,897,467 B2
(45) Date of Patent: Jan. 19, 2021

(54) METHOD AND ARRANGEMENT FOR CONFIGURING A SECURE DOMAIN IN A NETWORK FUNCTIONS VIRTUALIZATION INFRASTRUCTURE

(71) Applicant: TELEFONAKTIEBOLAGET LM ERICSSON (PUBL), Stockholm (SE)

(72) Inventors: Giuseppe Celozzi, Naples (IT); Luca Baldini, Rome (IT); Daniele Gaito, Naples (IT); Gaetano Patria, San Prisco (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 181 days.

(21) Appl. No.: 16/096,069

(22) PCT Filed: May 27, 2016

(86) PCT No.: PCT/EP2016/062068
§ 371 (c)(1),
(2) Date: Oct. 24, 2018

(87) PCT Pub. No.: WO2017/202475
PCT Pub. Date: Nov. 30, 2017

(65) Prior Publication Data
US 2019/0132330 A1    May 2, 2019

(51) Int. Cl.
*H04L 29/06* (2006.01)
*G06F 9/455* (2018.01)
(Continued)

(52) U.S. Cl.
CPC ........ *H04L 63/105* (2013.01); *G06F 9/45558* (2013.01); *G06F 9/5077* (2013.01);
(Continued)

(58) Field of Classification Search
CPC ..... H04L 63/105; H04L 63/04; H04L 63/104; H04L 67/1097; H04L 41/0893;
(Continued)

(56) References Cited

U.S. PATENT DOCUMENTS 8,035,542 B2    10/2011    Ishikawa
8,832,784 B2 *   9/2014    Budko ................... G06F 21/53
                                                            726/1
(Continued)

FOREIGN PATENT DOCUMENTS

| CN | 105429780 A | 3/2016 |
| WO | 2015167595 A1 | 11/2015 |
| WO | 2016048430 A1 | 3/2016 |

OTHER PUBLICATIONS

3G TS 23.271 V2.0.0., "3rd Generation Partnership Project; Technical Specification Group Services and System Aspects; Functional stage 2 description of LCS (Release 4)", Dec. 2000.
(Continued)

*Primary Examiner* — Farid Homayounmehr
*Assistant Examiner* — Sanchit K Sarker
(74) *Attorney, Agent, or Firm* — Sage Patent Group

(57) ABSTRACT

It is disclosed a method, an arrangement and a computer program for configuring a secure domain, SD, in a network functions virtualization infrastructure. The SD comprises virtual objects handling privileged information. NS instance information of a virtual object is obtained based on input from a party associated with the SD. The NS instance information is searched for a level of confidentiality and a geographic location information. When having identified the level of confidentiality and the geographic location information, the virtual object is allocated to the SD according to the geographic location information, based on the level of confidentiality and a specific role of the party. It is an
(Continued)

advantage that access to a SD is allowed or granted based on the specific role of the party.

16 Claims, 4 Drawing Sheets

(51) Int. Cl.
| | |
|---|---|
| *H04L 29/08* | (2006.01) |
| *G06F 21/53* | (2013.01) |
| *H04L 12/24* | (2006.01) |
| *H04W 12/02* | (2009.01) |
| *G06F 9/50* | (2006.01) |
| *H04W 12/00* | (2009.01) |

(52) U.S. Cl.
CPC .......... *G06F 21/53* (2013.01); *H04L 41/0893* (2013.01); *H04L 63/04* (2013.01); *H04L 63/104* (2013.01); *H04L 63/107* (2013.01); *H04L 67/1097* (2013.01); *H04W 12/02* (2013.01); *G06F 2009/45587* (2013.01); *G06F 2009/45595* (2013.01); *H04W 12/00503* (2019.01)

(58) Field of Classification Search
CPC ... H04L 63/107; G06F 21/53; G06F 9/45558; G06F 9/5077; G06F 2009/45595; G06F 2009/45587; H04W 12/02; H04W 12/00503
USPC .......................................................... 726/4
See application file for complete search history.

(56) References Cited

U.S. PATENT DOCUMENTS

| | | | |
|---|---|---|---|
| 9,270,703 B1 | 2/2016 | Clough et al. | |
| 10,701,139 B2* | 6/2020 | Li | H04L 67/1008 |
| 2017/0257276 A1* | 9/2017 | Chou | H04L 41/0896 |
| 2020/0084091 A1* | 3/2020 | Iovene | H04L 41/082 |

OTHER PUBLICATIONS

3GGP TS 22.071 V5.1.1., 3rd Generation Partnership Project; Technical Specification Group Services and System Aspects; Location Services (LCS); Service description; Stage 1 (Release 5), May 14-17, 2002, Victoria, Canada.
ANSI INCITS 359-2004, "American National Standard for Information Technology—Role Based Access Control", Feb. 3, 2004.
ETSI GS NFV-SEC 003 V1.1.1, "Network Functions Virtualisation (NFV); NFV Security; Security and Trust Guidance", Dec. 2014.
ETSI TS 133 107 V12.12.0, "Universal Mobile Telecommunications Systems (UMTS); LTE; 3G security; Lawful interception architecture and functions", Oct. 2015.
ETSI GS NFV-MAN 001 V1.1.1, "Network Functions Virtualisation (NFV); Management and Orchestration", Dec. 2014.
ETSI GS NFV-SEC 001 V1.1.1, "Network Functions Virtualisation (NFV); NFV Security; Problem Statement", Oct. 2014.
First Chinese Office Action for Chinese Patent Application No. CN 201680086157.8 dated Nov. 2, 2020, 11 pages (including English translation).
Jinglei, Liu et al., 3GPP TSG-SA5 (Telecom Management) SA5 #97, S5-145400, "Minutes for Study on Network Management of Virtualized Networks, OAM Rapporteur Report", Venice, Italy, Oct. 20-24, 2014, 11 Pages.

* cited by examiner

METHOD AND ARRANGEMENT FOR CONFIGURING A SECURE DOMAIN IN A NETWORK FUNCTIONS VIRTUALIZATION INFRASTRUCTURE

TECHNICAL FIELD

This disclosure relates to a network functions virtualization infrastructure. More particularly, it relates to a method, an apparatus and a computer program for configuring a secure domain in a network functions virtualization infrastructure.

BACKGROUND

Telecom networks contain an increasing variety of proprietary hardware appliances. Each network service, as illustrated in FIG. 1, may require a separate hardware appliance.

Moreover, hardware-based appliances follow hardware lifecycles which become shorter thereby reducing the return-on-investment of deploying new services in an increasingly network-centric world.

Network Functions Virtualization (NFV), being a network operator-led industry specification group aims to work through technical challenges therefore, by evolving standard Internet technology (IT) virtualization technology to consolidate many network equipment types onto industry standard high volume servers, switches and storage.

NFV involves implementing network functions in software capable of running on a range of industry standard server hardware, which can be moved to, or instantiated in, various locations in the network as required, without the need to install new equipment. NFV decouples software implementations of network functions from compute, storage, and networking resources by introducing a virtualization layer. Virtualized network functions (VNFs) have an ability to elastically scale, to perform commissioning, capacity planning and management of devices. This ability becomes more complex and requires specific solutions. It is envisaged that NFV will have a significant impact on the design of future telecommunications support systems.

When a network operator dimensions or operates an infrastructure, interdependency between multiple software elements being virtualized may have to be taken into account:

Network function (NF): A functional block (FB) within a network infrastructure which has well-defined external interfaces and well-defined functional behaviour.

Network service (NS): Described by its descriptor file, and orchestrated by NFV orchestrator (NFVO). NS may cover one or more VNF graphs, VNFs and physical network functions (PNFs).

Network service descriptor (NSD): Has static information elements as defined below. It is used by the NFVO to instantiate a NS, which would be formed by one or more VNF Forwarding Graphs, VNFs, PNFs and virtual links (VLs). The NSD also describes deployment flavours of the NS.

Virtual link descriptor (VLD): Provides a description of each VL. This type of information may be used by the NFVO to determine an appropriate placement of a VNF instance. This type of information may also be used by the virtualized infrastructure manager (VIM) that is responsible for managing the virtualised resources of the selected placement, to determine an allocation of required virtualised resources on a host with adequate network infrastructure. The VIM, or another Network Controller, can also use this information to establish the appropriate paths and virtual local area networks (VLANs). The VLD describes the basic topology of the connectivity between one or more VNFs connected to this VL and other required parameters (e.g. bandwidth and quality of service (QoS) class). The VLD connection parameters are expected to have similar attributes to those used on the ports on VNFs.

Virtual Link (VL): Represents the type of network connectivity mandated by the VNF vendor between two or more connection points.

Connection point (CP): This element describes an external interface exposed by this VNF enabling connection with a VL.

Virtual machine (VM): a virtualized computation environment which behaves very much like a physical computer/server.

Virtualized network function (VNF): An implementation of an executable software program that constitutes the whole or a part of an NF and can be deployed on a virtualization infrastructure. It is described by its descriptor file, instantiated by the VNF manager or NFVO.

VNF is composed by several software components called VNF Components (VNFCs) and VNFC Instance maps to a NFVI Virtualized container, for instance a VM. In order to instantiate the virtual network function defined by a VNF, VNF Manager may create one or more VNFCIs, where each VNFCI is in its own a virtualization container or a VM.

VNF forwarding graph (VNF-FG): described by its descriptor file, orchestrated by NFVO; may cover VNF-FGs, VNFs and NFs.

VNF instance (VNFI): a run-time instantiation of the VNF, resulting from completing the instantiation of VNF, using the VNF deployment and operational information captured in the VNF descriptor (VNFD), as well as additional run-time instance-specific information and constraints.

Virtualization deployment unit (VDU): a construct that can be used in an information model, supporting the description of the deployment and operational behaviour of a subset of a VNF, or the entire VNF, if it was not componentized in subsets.

FIG. 2 schematically illustrates one example of network functions virtualization management and orchestration architecture. In gross, the management and orchestration architecture comprises a NFV orchestrator (NFVO) and a VIM, each having a reference point to a VNF manager. An Operations support system/Business support system (OSS/BSS) has a reference point to the NFVO, and another reference point to an element management system (EMS), which in turn has one reference point to the VNF manager and another to VNF. The VNF has a reference point to the VNF manager and another to the NFV infrastructure. The NFV infrastructure has a reference point to the VIM, which has another reference point to the NFVO.

A telecom system may be composed of different physical instances that operate on different physical hardware. Each computing instance is herein denoted a component of a node and the totality of the components a node, a node is a telecommunication system; i.e. a physical network function (PNF) or a virtualized network function (VNF).

Complex systems, like telecom systems, may be mapped to more than one virtual machine, when virtualized. On single server hardware, more than one node component may run in a separate virtual machine and many virtual machines may run on server hardware inside the cloud data center.

When designing virtual infrastructure services, administrators consider both the structure of individual virtual machines as well as interactions between the virtual machines in an environment, as they for instance go online, move, and expire.

Different components of the VNF may run in different VM's. VM's may be of different types depending on the software running in the VM. VMs may be grouped according to the type of function that a component of the VNF is responsible of. Within each group of VM's that implement a component one or more can be active at any moment.

A cloud having a virtualization infrastructure may have a hierarchy of administrators. For example, an administrator of the virtualization infrastructure may have privileges greater than or equal to privileges of any administrators of virtualized functions, which may be executing on the system.

For communication between VNF components, between VNF components and storage and communication with external VNFs, it is of relevance to regulate who can control and operate the virtual links, especially where the VNF components and the storage are located.

When considering privacy issues and/or national regulations, protocol tracing and port mirroring are critical, and if being executed in a virtualized environment without any restrictions they may affect security of transported information.

Port mirroring may for example be used on a network switch to send a copy of network packets seen on one switch port, or an entire virtual local area network (VLAN), to a network monitoring connection on another switch port.

Protocol tracing refers to a possibility to filter, capture, store, decode and present protocol information.

File transfer may also have to be subject to authentication based on operations and maintenance (O&M) role, where some files may be more sensitive than others, and streaming may be subject to a super-user like authority.

Depending on requirements posed by national regulations and laws, a cloud service provider (CSP) may be required to handle and store data within national boundaries.

A role based access control (RBAC) model of NFV of European Telecommunication standard institute (ETSI) indicates in general that a secure domain (SD) may be defined separated from other domains.

Secure domain (SD) refers herein to sensitive data.

However, it has not been solved how SD data shall be visible to legitimate parties only. There is thus a demand for an improved solution circumventing or at least diminishing issues when handling sensitive data.

SUMMARY

It is an object of exemplary embodiments herein to address at least some of the issues outlined above and to prevent un-authorized access to SD data. This object and others are achieved by an apparatus that is capable of configuring a secure domain, a method and a computer program therefore, according to the appended independent claims, and by the exemplary embodiments according to the dependent claims.

According to an aspect, the exemplary embodiments provide a method for configuring a secure domain (SD), in a network functions virtualization infrastructure (NFVI). The SD is controlled by a network functions virtualization orchestrator (NFVO) and a virtualized infrastructure manager (VIM). The NFVO and the VIM are connected to a virtualized network function manager (VNFM). The SD comprises virtual objects handling privileged information. The method comprising obtaining from the NFVO or the VNF manager, network service (NS) instance information of a virtual object, based on input from a party associated with the SD. The method also comprises searching in the NS instance information, for a level of confidentiality and geographic location information. In addition, the method comprises, when having identified the level of confidentiality and the geographic location information, allocating the virtual object to the SD according to the geographic location information, based on the level of confidentiality and a specific role of the party.

According to another aspect, the exemplary embodiments provide an apparatus that is capable of configuring a secure domain (SD), in a network functions virtualisation infrastructure (NFVI). The SD is controlled by a network function virtualizations orchestrator (NFVO), and a virtualized infrastructure manager (VIM), where the NFVO and the VIM are associated with a virtualized network function manager (VNFM). The SD comprises virtual objects handling privileged information. The apparatus has a processing circuit and a memory circuit. The memory circuit has instructions executable by the processor circuit. The processing circuit, when executing the instructions, is configured to obtain, from the NFVO or the VNF manager, network service (NS) instance information of a virtual object, based on input from a party associated with the SD. The processing circuit, when executing the instructions, is also configured to search in the NS instance information, for a level of confidentiality and geographic location information. In addition, the processing circuit, when executing the instructions, is also configured to allocate the virtual object to the SD according to the geographic location information, based on the level of confidentiality and a specific role of the party, when having identified the level of confidentiality and the geographic location.

According to further aspects, the object is also achieved by a computer program and a computer program product comprising a computer-readable storage medium whereon the computer program is stored.

Examples and embodiments as described have one or more of the following advantages and preferable features:

It is advantageous that access to a SD is allowed or granted based on the specific role of the party.

By configuring a SD and subjecting the SD to a data stream, data in a VNF may be extracted securely.

Boundaries of VNF objects are securely located.

Infringement detection is facilitated by verifying level of confidentiality of an object, location parameter configuration, authorization and access roles hierarchies.

It is also an advantageous feature that location verification change algorithms may be defined once location information is secured.

BRIEF DESCRIPTION OF THE DRAWINGS

Embodiments will now be described in more detail, and with reference to the accompanying drawings, in which.

DETAILED DESCRIPTION

Figure 1:
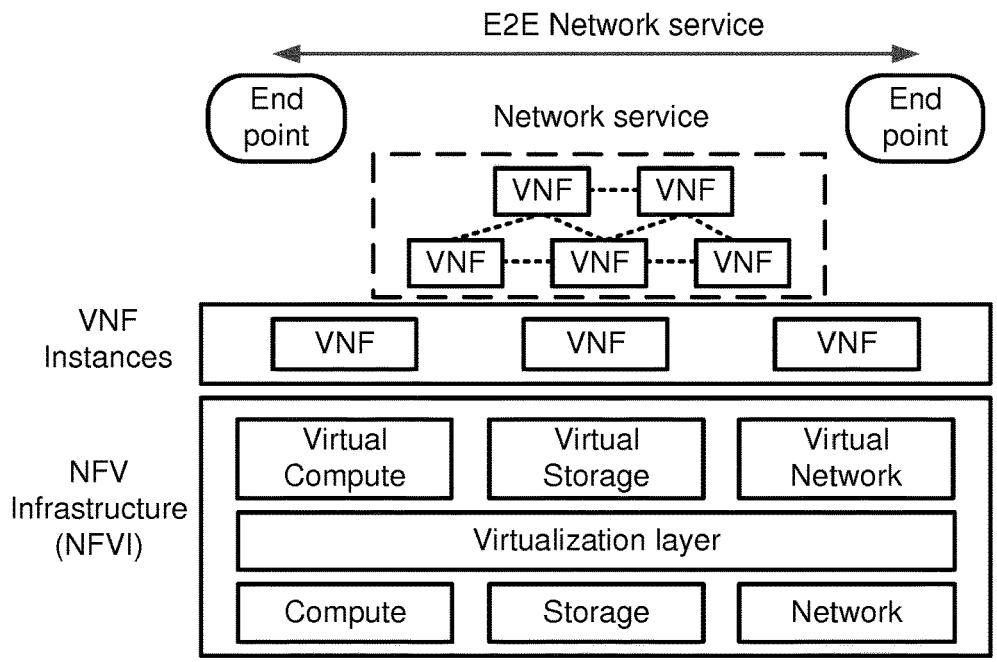
FIG. 1 schematically illustrates network function virtualization components of an end-to-end network service (NS)
Figure 2:
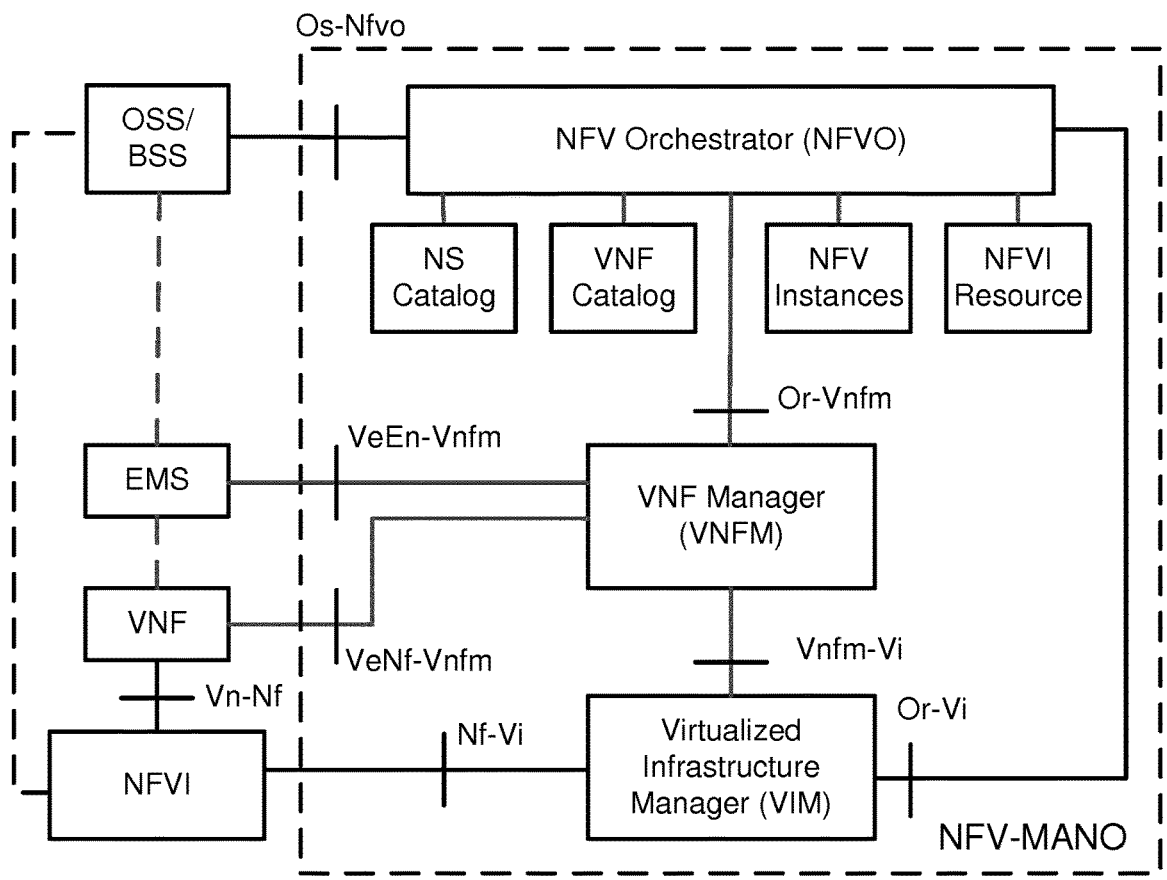
FIG. 2 schematically illustrates network functions virtualization management and orchestration architecture.

In the following description, exemplary embodiments will be described in more detail, with reference to accompanying drawings. For the purpose of explanation and not limitation, specific details are set forth, such as particular examples and techniques in order to provide a thorough understanding.

There is hence a demand for a solution that solves or at least diminishes the problem how to prevent SD data to be visible to other administrators or users of another domain.

As indicated, sensitive data is herein referred to as a secure domain (SD), which data shall be treated in a different way, as compared to data outside the secure domain.

Information leakage may occur from any VNF components and/or storage of a secure domain. These may to be protected and access permitted to authorized parties only.

Based on customer requirements it is proposed that an administrator of the virtualization infrastructure only shall enjoy privileges lower than the operator of at least some virtualized functions.

In particular, some objects shall be accessed and modified only by personnel with a proper authorization level.

Authorized user access shall be configurable within a serving network to access physical or logical ports. User access shall be hence password protected.

Only authorized parties, or personnel, having specific roles shall be able to access and modify some virtualized objects.

Through the use of access restrictions, only authorized parties, network entities or remote equipment shall be able to view or manipulate virtualized objects and data of a secure domain.

Trace frameworks may have to be restricted and shall only be activated by authorized users or personnel for SD information.

Transfer of trace files or trace streaming to external systems will also have to be secure.

A trace that is streamed to external storage shall preferably be secure.

Further, VM images to be used in SD shall preferably also be protected in a SD storage, for instance either one by one, or protected in a SD where the entire storage is located in the SD.

Log-files shall preferably also be protected in a SD storage, either one by one, or protected in a SD where the entire storage is located in the SD.

Moreover, all actions of the objects shall preferably be recorded, and associating time and user information to the record created.

Accordingly, the present disclosure is related to how to extract data in a secure and authenticated way and control location of all VNF objects used for a security domain.

Location information associated with any object involved in the secure domain shall be reported and protected, for instance of VNFs and virtual storage (VS).

Only parties with proper access rights shall be able to access and modify such information. This is true, in particular for SD information that shall never be stored in a location outside country boundaries. This is normally defined by national law and regulations and restrictions can apply on where this data is stored or transits.

In particular if a hierarchical authorization is applied to the MANO administrators, administrators may have permissions higher than those of users. Especially, if administrators and cloud administrators were in separate hierarchies, else cloud administrators would have the permissions of SD administrators and/or SD users.

Moreover location information has not available for virtualized objects involved in a SD function. There may be applications for which virtualized objects used for storing or transferring SD sensitive information are used without the possibility to restrict the location to a specific country.

It has not been possible to determine whether some VNFCI location has been changed during operation of a SD operation, due to malicious attempt or because of a VNF migration into a different data centre (e.g. outside national borders), once the SD is configured for a specific virtualized object.

Henceforth, the disclosure provides means to prevent any un-authorized access to SD data, by using a specific security domain and operations in a virtualized environment.

Two new pieces of information to be associated to virtualized objects, are herein proposed in order to enforce a configuration of a SD.

These new pieces of information consist of a "level of confidentiality" of an object and a location of said object. These new pieces of information, or attributes, are required for objects that contain SD sensible information. This will make it possible, for instance, to verify whether a VNFCI is currently located in, or has been moved to, a physical location outside national borders.

Figure 3:
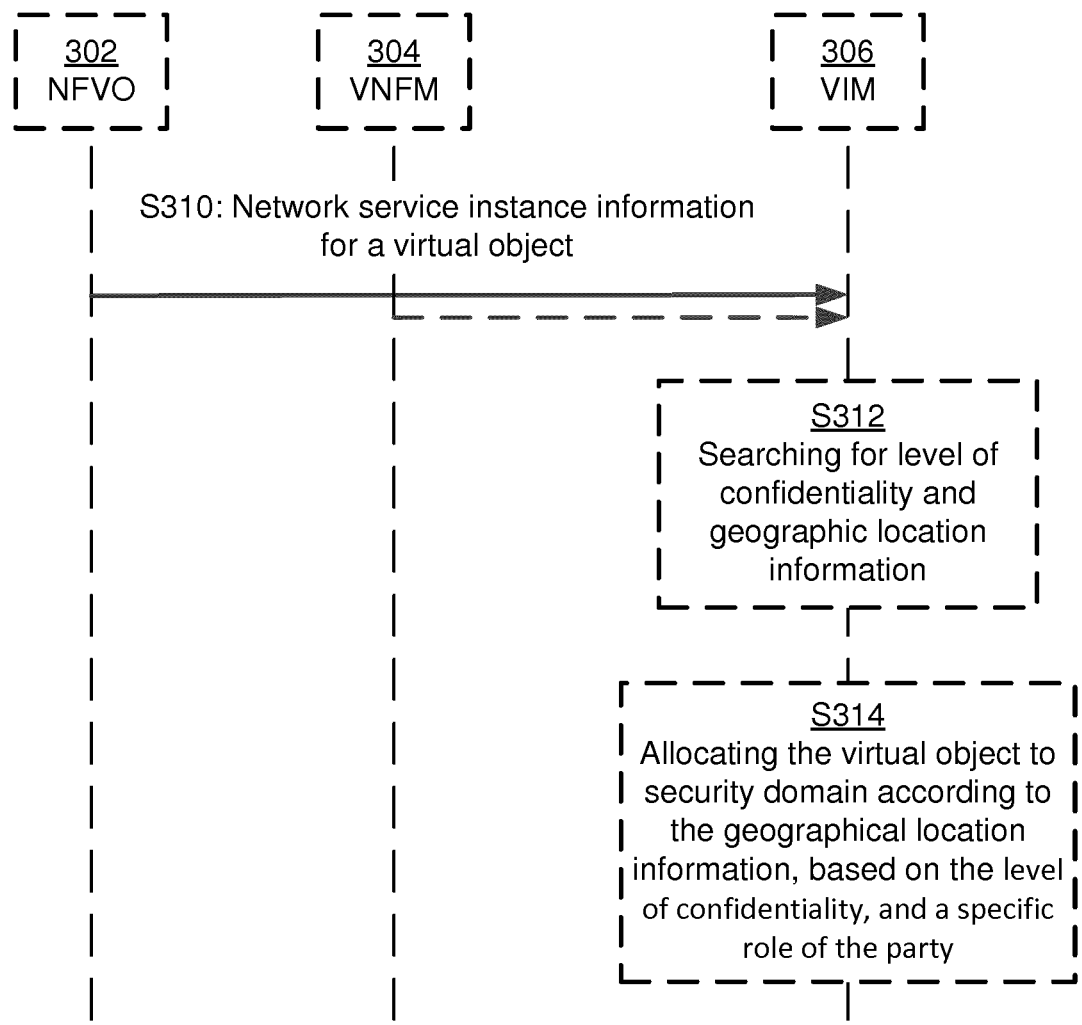
FIG. 3 schematically presents a handshake diagram, according to examples of the present disclosure.

FIG. 3 schematically presents a handshake diagram for configuring a SD in a network functions virtualization infrastructure (NFVI). The SD is controlled by a network functions virtualization orchestrator (NFVO) 302 and a virtualized infrastructure manager (VIM) 306, according to examples of the present disclosure. The NFVO and the VIM are connected to a virtualized network function (VNF) manager, 304. The SD comprises virtual objects that may handle privileged or sensitive information. Signalling is hence performed between the NFVO 302 and the VIM 306.

In action S310 of the handshake diagram, network service (NS) information of a virtual object, based on input from a party associated with the SD, is sent from the NFVO to the VIM.

In action S312 it is performed searching in the NS instance information, for a level of confidentiality and geographic location information.

In action S314 the VIM is performing, when having identified the level of confidentiality and the geographic location information, allocating the virtual object to the SD according to the geographic location information, based on the level of confidentiality and a specific role of the party.

Action S310 may alternatively comprise sending the NS information of the virtual object, based on input from a party associated with the SD, from the VNF manager (304) to the VIM.

Further, certain objects and operations, which may be listed, may need to use the confidentiality and geographic location information to implement a secure domain based on the role based access control (RBAC).

A novel administration functionality is proposed to avoid that any object that can be used in a SD domain is accessed by anybody except SD parties. The functionality may use the new attributes and may be described as a "RBAC functionality with attributes".

In order to identify objects with specific security constraints, the following observations are made.

Virtual or physical objects, which may comprise sensitive information, may be associated with the new attribute that indicates a level of confidentiality of the object and the new location attribute, which indicates the national state where the object is located or stored.

Location Information attribute value associated with virtual objects in VIM may be used by a system to allow only resources which are located in a specific location domain (i.e. a national state) to be used in the definition of any function associated with a requested SD service.

The SD and its access rights, shall be such that they allow enforcement of an application, and of the location attribute.

In fact any object, such as a virtual link or a storage object may be included in a VNF definition only the link or storage belongs to the allowed location. Here fore, specific filters may be enforced to allow only objects which are compliant with requested location characteristics to be used to allocate the VNF.

The secure domain may preferably be defined in a way as the users of one domain shall be completely separated from the other to enforce separation of duty which increases security.

The commands used to extract and duplicate SD intercept data from a data stream or a virtual connection may be operated by parties belonging to SD party hierarchies.

Capturing or just receiving SD traffic needs special handling; connection will have to be secure and not accessible to anyone except the party with proper authorization. SD parties shall be able to access and configure the network connections independently from the other cloud parties and thus not exposing them to security risks.

The SD shall be configured such that only the parties belonging to the SD domain can see and configure the protected network connections used in the deployment of the SD network functions; if this is not done this will become a violation of the security.

The SD may also enforce separation of duty (SOD), in fact it is preferable to define a different administrator/user profile to separate an administrator of the VNFC instances and normal network connection of virtual objects from an administrator of the VNF "protected" virtual objects. This administrator/user profile is the only one that may act on the VNF using the proper O&M interface.

The access model shall be defined in a way as parties of one domain shall be completely separated from other parties, of another domain.

In addition to geographic location attribute, and roles connected to that, additional roles may be used as the base for a hierarchy of roles to access security sensitive objects. Objects having a level of confidentiality that is classified, may only be acted upon by parties having certain roles. SD roles may the only one to read or modify these attributes.

It is proposed that additional roles may be part of a completely separated hierarchy to avoid the risk that an administrator role creates users that can be assigned SD administration roles or creates SD users without proper authorization.

In fact, if role hierarchies are not separated or role privileges are inherited an administrator role could create parties that can be assigned SD administration roles or SD user roles which could bypass security constraints or in case roles inherit privileges, an administrator could act as a SD administrator or SD user and therefore act on classified objects.

As an alternative, a cloud administrator role and cloud SD administrator role may be assigned to one party having SOD applied already to this level. This implies that even a cloud administrator may not perform any action on sensitive objects, not even listing (READ only).

Here below is presented one example of a minimal role hierarchy. Additional roles may extend the hierarchy as long as security principles are complied with.

Example operations that may be considered are Create, Read, Update and Delete (CRUD) operated on objects. This comprises many variations, for instance cloning of data streams should be considered as a "create" type of operation and similarly for other specified operations.

The objects involved may be VL, VNF, VNFC, VNFCI, virtual machine image, VS, vTap, and/or vFEP, whenever they are used to implement a SD function.

A cloud administrator will have permission to create a tenant administrator.

A tenant administrator will have permission to create tenant users in standard data center domain.

A tenant user will have permission to create CRUD objects, except SD protected objects.

And especially, a cloud administrator SD, that is, an administrator in the secure domain of the cloud, will have permission to create a SD tenant administrator, that is, an administrator of a secure domain of a tenant.

An SD tenant admin will have permission to create tenant users in the SD domain. For additional security only one administrator should be enabled at any time for each tenant.

Accordingly, an SD tenant user will have permission to CRUD SD protected objects of that particular tenant.

An SD tenant role or party supports only restricted hierarchy, i.e. a hierarchy for that tenant only. Such a restriction may be implemented as a tree hierarchy.

In addition to the roles or parties as mentioned above, separation of duty (SOD) may also be applied for SD.

Usually, a senior role being the role that is higher in a hierarchy, for instance in a tree pictorial representation, typically would inherit permissions on operations from roles junior, or lower, roles in the hierarchy. When applying SOD, this not allowed.

For instance, users may have permission to perform CRUD operations on objects.

However, administrators will only have permission to perform CRUD operations on the users, not the objects.

Similarly, an SD tenant user will have permission to perform CRUD operations on SD objects.

However, an SD administrator will not be able to perform CRUD operations on the objects as role inheritance would allow, but only on the SD tenant users.

SD Operations permitted to an authorized party, hence acting on a SD domain, are not acting on the VIM domain, but operate at an application level will need to be in line with infrastructure operations. Application users being allowed to perform such actions may preferably be aligned with the cloud users being allowed to perform modifications on the virtual infrastructure. Application users are preferably aligned to cloud users.

Figure 4A:
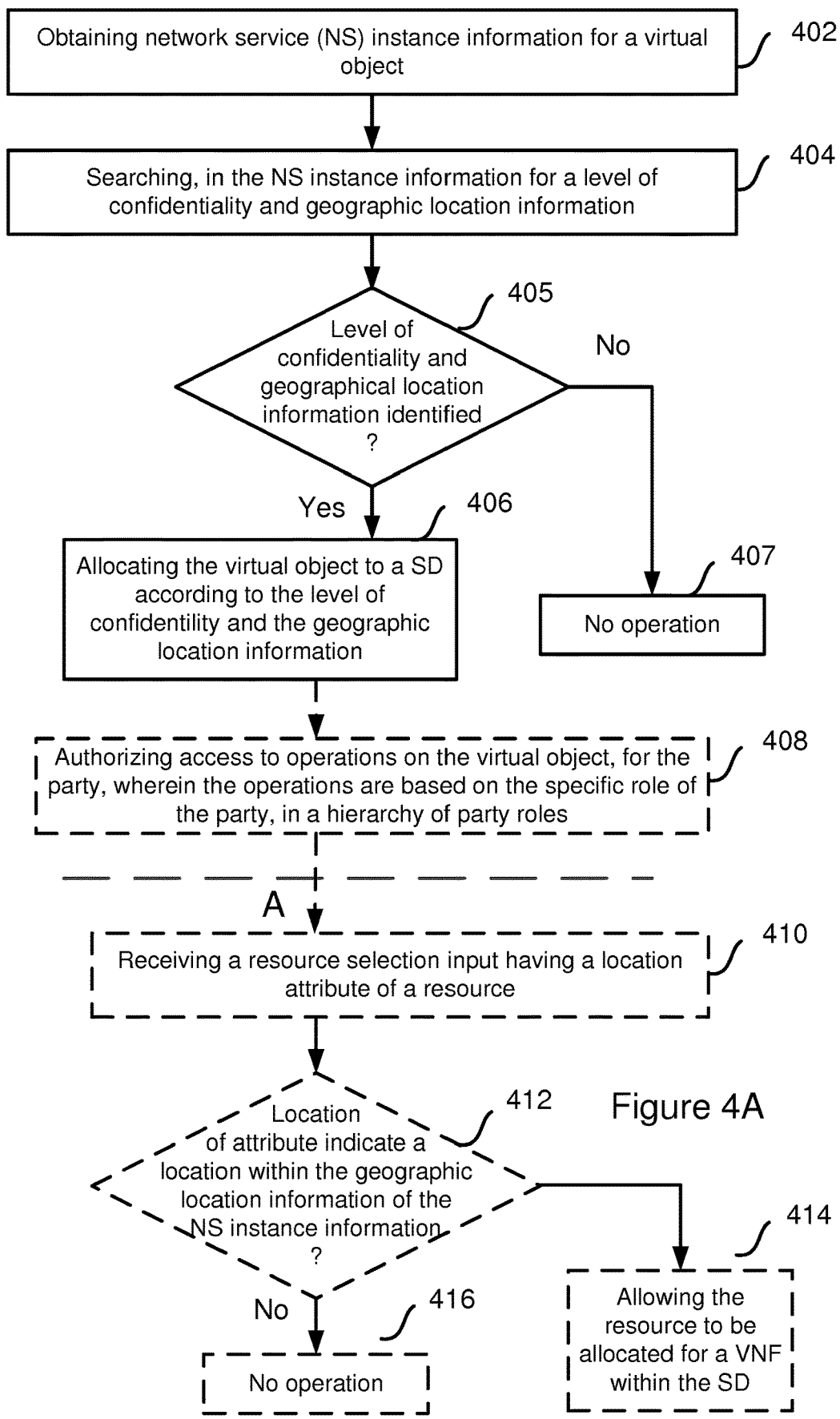
FIGS. 4A and 4B present actions of a method for configuring a secure domain, according to some embodiments.
Figure 4B:
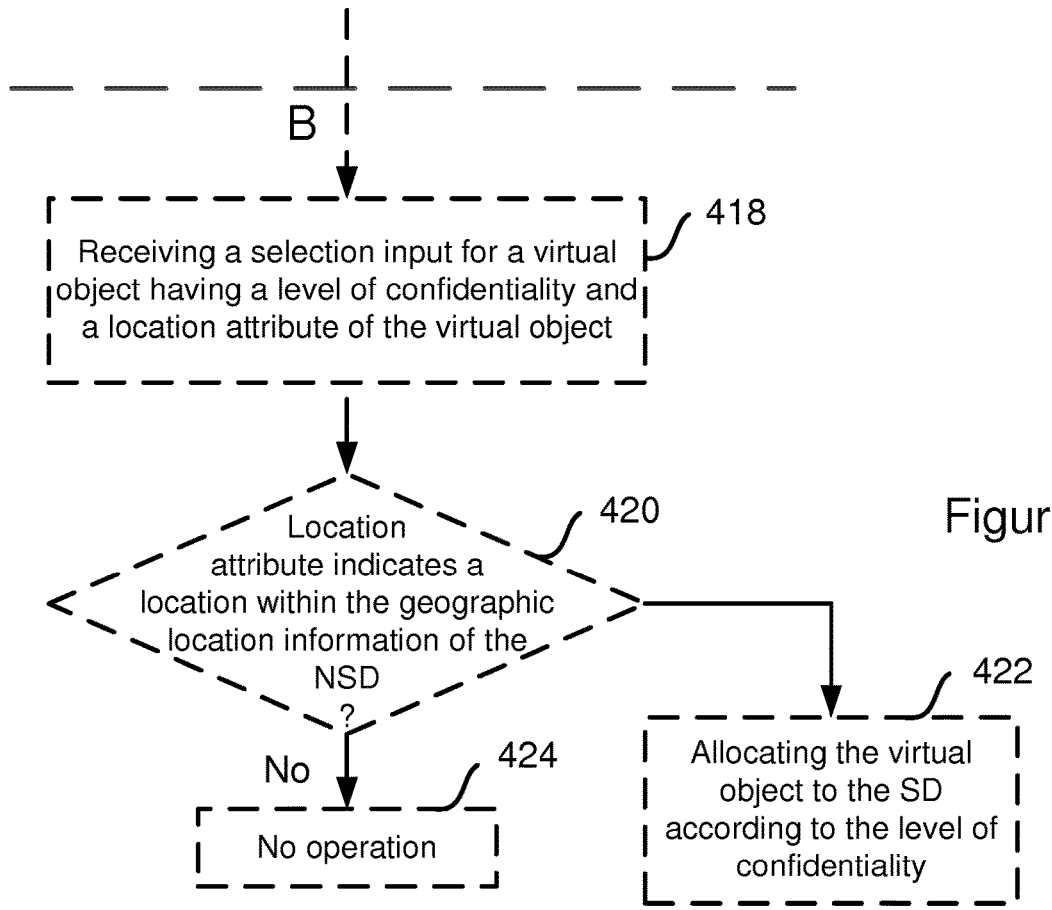

FIGS. 4A and 4B present actions of a method for configuring a secure domain, in a NFVI, according to some examples of the present disclosure. The SD is controlled by a network NFVO (302) and a VIM (306), where the NFVO and the VIM are connected to a VNFM (304). The SD comprises virtual objects handling privileged information. The examples hence comprise the following actions.

It is illustrated in FIG. 4A:

In action 402, network service (NS) instance information is being obtained, from the NFVO or the VNF manager, for a virtual object, based on input from a party associated with the SD.

Action 404, the NS instance information is being searched for a level of confidentiality and geographic location information.

In action 405, it is determined whether the level of confidentiality and geographical location information is identified in the NS instance information, or not.

Action 406: If having identified the level of confidentiality and geographical location information from the NS instance information, i.e. when action 405 is answered by a "Yes", the virtual object is allocated to the SD according to the geographic location information, based on the level of confidentiality and a specific role of the party.

Action 407: If the level of confidentiality and geographical location information is not identified from the NS instance information, i.e. when action 405 is answered by a "No", no operation of allocating to the SD can be performed.

The examples may also comprise the following actions:

In action 408, authorizing access to a set of operations on the virtual object, for the party, may be performed, wherein the operations are based on the specific role of the party, in a hierarchy of party roles.

The hierarchy of party roles may comprise a hierarchy of one or more user roles and one or more administrator roles.

The set of operations may comprise any one of: allocating a VNF, performing a network or storage request, and updating or querying an allocated resource.

Separation of duty may be applied to the hierarchy of party roles comprising the specific role of the party based on which operations on the virtual object, are authorized access to.

Obtaining NS instance information may comprise allocating NS instance information from the NFVO or from the VNF manager.

The virtual object being allocated to the SD may comprise any one of: a virtual link, a VNF, a VNF component, a VNF component instance, a virtual storage, a virtual machine, a virtual machine image, vTap and vFEP.

According to one scenario A, further action may be performed.

Action 410: A resource selection input may be received from the NFVO or the VNF manager, said resource selection input having a location attribute of a resource.

In action 412 it is then determined whether the location attribute indicate a location within a geographic location information of the NS instance information, or not.

Action 414: If action 412 is answered with a "Yes", i.e. that the location attribute indicates a location within geographic location information of the NS instance, it is allowed to allocate the resource to a VNF of the NS.

The resource that is allowed to allocate to the VNF may comprise storage resource or a virtual link.

Action 416: If however, action 412 is answered with a "No", i.e. that the location attribute does not indicate a location within a geographic location information of the NS instance information, no allocation of resources is performed.

It is further illustrated in FIG. 4B, a further or alternative scenario B. Herein further actions may be performed.

Action 418: A selection input for a further virtual object, where the selection input comprises a level of confidentiality of the further virtual object and a location attribute of the further object, may be received from the NFVO or the VNF manager.

In action 420 it may then be determined whether the location attribute indicates a location within geographic location information of the NS instance information, or not.

Action 422: If action 420 is answered with a "Yes", i.e. that the location attribute of the further virtual object indicates a location within the geographic location information of the NS instance information, the further virtual object may be allocated to the NS according to the level of confidentiality as comprised in the selection input, based on the specific role of the party.

Action 424: If however, action 422 is answered with a "No", i.e. that the location attribute does not indicate a location within a geographic location information of the NS instance information, no allocation of virtual object can be performed. The method may further comprise checking whether location attributes of a second virtual object and of a second virtual link for accessing the second virtual object, where the second virtual object is allocated to an existing VNF, indicate a second location within or outside the borders of a jurisdiction indicated in the geographic location information of the received NS instance. The method may furthermore comprise configuring the SD to allow lawful intercept (LI) by a privileged party in a hierarchy of the roles, when said location attributes of the second virtual object and of the second virtual link for accessing the second virtual object, indicate a second location within said borders of the jurisdiction, based on the role of the privileged party.

Scenarios A and B may be exclusive, but may alternatively be performed in sequence or in parallel.

The present disclosure also comprises a computer program that is configured, when run on a computer, to perform the method as described above.

The present disclosure further comprises a computer program product comprising a computer-readable storage medium and the computer program of above. The computer program may be stored on the computer readable storage medium.

Creation of VNF may be modified to take into account that a SD handling can be added later. In order to subject a node to SD, all storage where data may be stored should be within a certain geographical location, such as a national boundary. As an alternative, a determination may be made when a SD function is added. This implies that a location shall be sent to VIM and the infrastructure would have to ensure that particular storage is going to be used and the path to access it is within the geographic location, such as national boundaries, as indicated by the location parameter given.

New resources, such as nodes, may be added to a function, or a VNF may be migrated in its components, by updating location parameters in the resource selection input sent to the VIM by either the VNFM or the NFVO.

The method may further comprise receiving 418, from the NFVO or the VNF manager, a selection input indicating scaling down of resources used for the SD, and erasing data stored on resources, used for the SD, to be removed prior to release of said resources.

If storage used for a SD is to be removed, the data stored thereupon may have to be erased before release. If scaling down includes a location parameter, this may be mandatory.

In the case a VNFCI that contains SD data fails, upon re-instantiation that the VNFC shall be instantiated within an unchanged location only. This may be solved by adding a location parameter in a resource selection input send to the VIM by either the VNFM or NFVO.

In the case storage is to be removed, data comprised therein will have to be erased before release. This may be added as a mandatory behaviour when the VNFC includes a location parameter.

All links involving the VNFCI may be re-assigned with particular attention to potential tampering.

VM images that are used to instantiate a VNFC in the VNF that is assigned to a SD may also be protected against tampering.

If requested by national regulation authorities, new virtual links may be added within one and the same location. This may be performed by adding a location parameter in the resource selection input that may be sent to the VIM by either the VNFM or NFVO. A tapping link may validly avoid this, if data in transit is allowed to cross national boundaries.

If an object is located in more than one state, a list of location information may be returned instead of single location information. Geographical information such as global positioning systems (GPS) settings may be included.

Existing operations that are not part of the SD, may be enforced by the SD. Therefore, the creation or modification of trace and tapping functions will be permitted only to SD users.

New virtual objects may be added to a SD.

Examples of specific objects that collect geographical information are geographical location objects, including coordinates, and a list of geographical location objects.

Objects having specific security constraints may be identified by the following:

Objects types comprising sensitive information may have a first attribute that indicates the level of confidentiality of the object and a second attribute, Location, which indicates the national state where the object is located or stored.

Location information attribute pointing to the list of geographical objects associated with virtual objects in VIM may be used by the system to allow only resources which are located in the specific location domain, i.e. a national state, to be used in the definition of any function associated with the services that apply in the SD.

The SD and the associated access right shall be such that it should be possible to enforce network service and link location. In fact any object such as a virtual link or a storage object will only be included in a VNF definition if it belongs to the allowed location; specific filters may be enforced in the system so that only objects compliant with requested location characteristics can be used to allocate the VNF.

This disclosure may implement the following:

A secure domain (SD) cannot be accessed by administrators or users of other domains. The function to define administrators and users belongs to this secure domain.

In case location of data is enforced, location information may be included in the objects and is visible and modifiable only by authorized parties to avoid tampering or redirection of data towards forbidden locations.

According to one example a duplication function may be applied to a virtual link indicating different end-points in the egress direction, and which function will forward only the security sensible content towards a secure SD collection end-point.

A SD shall not be visible to anyone except parties belonging to the SD, such as the users and the administrators.

Access to data streams potentially carrying SD data by any vTap, vFEP or any other capture device, may be denied, apart from devices which are configured by administrators and users belonging to the SD.

According to one example, access attempts from un-authorized parties such as user or administrator of the system may be traced in special security log with the number of attempts logged, and if the number of attempt passes a certain threshold, the account of the un-authorized parties will have to be disabled.

The creation of VLs may be performed in such a way as to enforce that the underlay comprised of physical links does not cross national or legislation borders.

Figure 5:
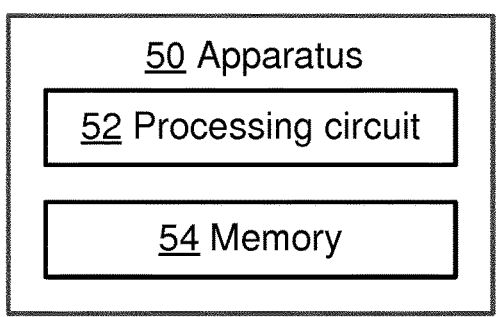
FIGS. 5 and 6 schematically present an apparatus capable of configuring a secure domain, according to some embodiments of the present disclosure.

FIG. 5 schematically presents an apparatus 50 capable of configuring a secure domain, in a NFVI, according to some embodiments of the present disclosure. The SD is controlled by a NFVO and a VIM, where the NFVO and the VIM are associated with a VNF manager (VNFM). The SD comprises virtual objects handling privileged information. The apparatus 50 comprises a processing circuit 52 and a memory circuit 54, where the memory circuit has instructions executable by the processor circuit. The processing circuit 52 is, when executing the instructions, configured to obtain, from the NFVO or the VNF manager, network service (NS) instance information of a virtual object, based on input from a party associated with the SD. The processing circuit 52 is, when executing the instructions, further configured to search in the NS instance information, for a level of confidentiality and geographic location information. In addition, the processing circuit 52 is, when executing the instructions, further configured to allocate the virtual object to the SD according to the geographic location information, based on the level of confidentiality and a specific role of the party, when having identified the level of confidentiality and the geographic location.

The processing circuit 52 when executing the instructions may further be configured to authorize access to a set of operations on the virtual object, for the party, wherein the operations are based on the specific role of the party, in a hierarchy of party roles.

The hierarchy of party roles, for the apparatus, may comprise a hierarchy of one or more user roles and one or more administrator roles.

The set of operations, for the apparatus, may comprise any one of allocating a VNF, performing a network or storage request, and updating or querying an allocated resource.

Separation of duty may be applied to the hierarchy of party roles, for the apparatus.

The processing circuit 52 when executing the instructions may be configured to allocate NS instance information from the NFVO.

The virtual object, for the apparatus, may comprise any one of: a virtual link, a VNF, a VNF component, a VNF component instance, a virtual storage, a virtual machine, vTap and vFEP.

The processing circuit 52 when executing the instructions further may further be configured to receive, from the NFVO, a resource selection input comprising a location attribute of a resource. Moreover, the processing circuit 52 when executing the instructions may further be configured, when the location attribute of the resource indicates a location within the geographic location information of the received NS instance, to allow the resource to be allocated for a VNF of the NS.

This resource may comprise storage resource or a virtual link.

The processing circuit 52 when executing the instructions may further be configured to receive from the NFVO, a selection input for a further virtual object. This selection input comprises a level of confidentiality of the further virtual object and a location attribute of the further virtual object. Moreover, the processing circuit 52 when executing the instructions may further be configured, when the location attribute of the further virtual object indicates a location within the geographic location information of the received NS instance, to allocate the further virtual object to the NS according to the level of confidentiality as comprised in the selection input, based on the specific role of the party.

The processing circuit 52 when executing the instructions may further be configured to check whether location attributes of a second virtual object and of a second virtual link for accessing the second virtual object, that is allocated to an existing VNF, indicate a second location within or outside the borders of a jurisdiction indicated in the geographic location information of the received NS instance. Moreover, the processing circuit 52 when executing the instructions may further be configured to configure the SD to allow lawful intercept (LI) by a privileged party in a hierarchy of the party roles, when said location attributes, of the second virtual object and of the second virtual link for accessing the second virtual object, indicate a second location within said borders of the jurisdiction, based on the role of the privileged party.

Figure 6:
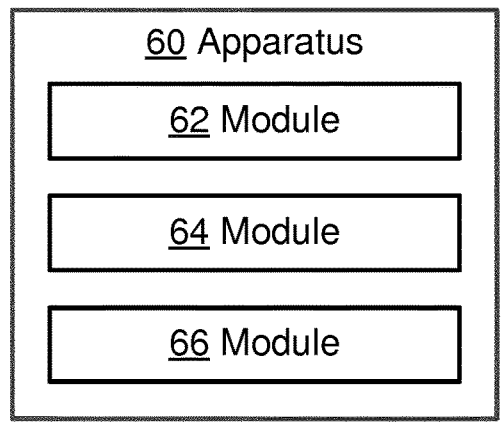

FIG. 6 schematically presents an apparatus 60 that is capable of configuring a SD, in a NFVI, according to some examples of the present disclosure. The SD is controlled by a NFVO and a VIM where the NFVO and the VIM are associated with a VNF manager. The SD comprises virtual objects handling privileged information. The apparatus comprises a module 62 for obtaining, from the NFVO or the VNF manager, NS instance information for a virtual object, based on input from a party associated with the SD. The apparatus also comprises a module 64 for searching in the NS instance information, for a level of confidentiality and geographic location information. In addition, the apparatus comprises a module 66 for allocating the virtual object to the SD according to the geographic location information, based on the level of confidentiality and a specific role of the party, when having identified the level of confidentiality and the geographic location information.

The apparatus 60 may further comprise a module authorizing access to a set of operations on the virtual object, for the party, wherein the operations are based on the specific role of the party, in a hierarchy of party roles.

The present disclosure also comprises a further apparatus that is capable of configuring a SD, in a NFVI, according to some examples of the present disclosure. The SD is controlled by a NFVO and a VIM where the NFVO and the VIM are associated with a VNF manager. The SD comprises virtual objects handling privileged information. The apparatus is further configured to obtain, from the NFVO or the VNF manager, NS instance information of a virtual object, based on input from a party associated with the SD. The apparatus is further configured to search in the NS instance information, for a level of confidentiality and geographic location information. In addition, the apparatus is also configured to allocate the virtual object to the SD according to the geographic location information, based on the level of confidentiality and a specific role of the party, when having identified the level of confidentiality and the geographic location.

Examples and embodiments as described herein have one or more of the following advantages and preferable features:

It is an advantage that access to a SD is allowed or granted based on the specific role of the party.

By configuring a SD and subjecting the SD to a data stream, data in a VNF may be extracted securely.

Boundaries of VNF objects are securely located.

Infringement detection is facilitated by verifying level of confidentiality of an object, location parameter configuration, authorization and access roles hierarchies.

It is also an advantage that location verification change algorithms may be defined once location information is secured.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

BSS business support system
CP connection point
CRUD create, replace, update and delete
CSP cloud service provider
E2E end-to-end
EMS element management systems
ETSI European telecommunications standards institute
FB functional block
FEP front end processor
FG forwarding graph
GPS global positioning systems
IT Internet technology
LI lawful intercept
MANO management and orchestration
NF network functions
NFV NFs virtualization
NFVI network functions virtualization infrastructure or NFV infrastructure
NFVO NFV Orchestrator
NS network service
NSD NS descriptor
O&M operations and maintenance
OSS operations support system
PNF physical network function
RBAC role based access control
SD secure domain
SOD separation of duty
TAP TAP Linux device interface
VDU virtualization deployment unit
VI virtualization infrastructure
VIM VI manager
VL virtual link
VLAN virtual local area network
VLD virtual link descriptor
VM virtual machine
VNF virtualized network function
VNFC virtual network function component
VNFCI VNFC instance
VNFD VNF descriptor
VNFI VNF instance
VNFM VNF manager
VS virtual storage

The invention claimed is:

1. A method for configuring a secure domain, SD, in a network functions virtualization infrastructure, NFVI, the SD being controlled by a network functions virtualization orchestrator, NFVO, and a virtualized infrastructure manager, VIM where the NFVO and the VIM are connected to a virtualized network function, VNF, manager, the SD comprising virtual objects handling privileged information, said method comprising:

obtaining, from the NFVO or the VNF manager, network service, NS, instance information of a virtual object, based on input from a party associated with the SD;

searching in the NS instance information, for a level of confidentiality and geographic location information; and when having identified the level of confidentiality and the geographic location information, allocating the virtual object to the SD according to the geographic location information, based on the level of confidentiality and a specific role of the party;

authorizing access to a set of operations on the virtual object, for the party, wherein the operations are based on the specific role of the party, in a hierarchy of party roles;

receiving, from the NFVO or the VNF manager, a selection input for a further virtual object, the selection input comprising a level of confidentiality of the further virtual object and a location attribute of the further virtual object;

when the location attribute of the further virtual object indicates a location within the geographic location information of the NS instance information, allocating the further virtual object to the NS according to the level of confidentiality as comprised in the selection input, based on the specific role of the party; and when the location attribute of the further virtual object does not indicate a location within the geographic location information of the NS instance information, the method further comprises: checking whether location attributes of a second virtual object and of a second virtual link for accessing the second virtual object, allocated to an existing VNF, indicate a second location within or outside borders of a jurisdiction indicated in the geographic location information of the NS instance information; and configuring the SD to allow lawful intercept, LI, by a privileged party in a hierarchy in the roles, when said location attributes of the second virtual object and of the second virtual link for accessing the second virtual object, indicate a second location within said borders of the jurisdiction, based on the role of the privileged party.

2. The method according to claim 1, wherein the hierarchy of party roles comprises a hierarchy of one or more user roles and one or more administrator roles.

3. The method according to claim 1, wherein the set of operations comprises any one of: allocating a virtualized network function, VNF, performing a network or storage request, and updating or querying an allocated resource.

4. The method according to claim 1, wherein separation of duty is applied to the hierarchy of party roles.

5. The method according to claim 1, wherein obtaining NS instance information comprises allocating NS instance information from the NFVO or from the VNF manager.

6. The method according to claim 1, wherein the virtual object comprises any one of: a virtual link, a VNF, a VNF component, a VNF component instance, a virtual machine image, a virtual storage, vTap and vFEP.

7. The method according to claim 1, further comprising:
receiving, from the NFVO or the VNF manager, a resource selection input, comprising a location attribute of a resource; and when the location attribute of the resource indicates a location within the geographic location information of the NS instance information, allowing the resource to be allocated for a VNF of the NS.

8. The method according to claim 7, wherein the resource comprises storage resource or a virtual link.

9. The method according to claim 1, further comprising:
receiving, from the NFVO or the VNF manager, a selection input indicating scaling down of resources used for the SD; and erasing data stored on resources, used for the SD, to be removed prior to release of said resources.

10. An apparatus capable of configuring a secure domain, SD, in a network functions virtualisation infrastructure, NFVI, where the SD is controlled by a network function virtualizations orchestrator, NFVO, and a virtualized infrastructure manager, VIM, where the NFVO and the VIM are associated with a virtualized network function, VNF, manager, the SD comprising virtual objects handling privileged information, the apparatus having a processing circuit and a memory circuit, the memory circuit having instructions executable by the processor circuit, wherein said processing circuit when executing the instructions is configured to:

obtain, from the NFVO or the VNF manager, network service, NS, instance information of a virtual object, based on input from a party associated with the SD;

search in the NS instance information, for a level of confidentiality and geographic location information; and allocate the virtual object to the SD according to the geographic location information, based on the level of confidentiality and a specific role of the party, when having identified the level of confidentiality and the geographic location;

authorize access to a set of operations on the virtual object, for the party, wherein the operations are based on the specific role of the party, in a hierarchy of party roles;

receive, from the NFVO or the VNF manager, a selection input for a further virtual object, the selection input comprising a level of confidentiality of the further virtual object and a location attribute of the further virtual object;

when the location attribute of the further virtual object indicates a location within the geographic location information of the NS instance information, allocate the further virtual object to the NS according to the level of confidentiality as comprised in the selection input, based on the specific role of the party; and when the location attribute of the further virtual object does not indicate a location within the geographic location information of the NS instance information, wherein the processing circuit when executing the instructions is configured to: check whether location attributes of a second virtual object and of a second virtual link for accessing the second virtual object, allocated to an existing VNF, indicate a second location within or outside borders of a jurisdiction indicated in the geographic location information of the NS instance information; and configure the SD to allow lawful intercept, LI, by a privileged party in a hierarchy in the roles, when said location attributes of the second virtual object and of the second virtual link for accessing the second virtual object, indicate a second location within said borders of the jurisdiction, based on the role of the privileged party.

11. The apparatus according to claim 10, for which the hierarchy of party roles comprises a hierarchy of one or more user roles and one or more administrator roles.

12. The apparatus according to claim 10, wherein the set of operations comprises any one of: allocating a VNF, performing a network or storage request, and updating or querying an allocated resource.

13. The apparatus according to claim 10, wherein separation of duty is applied to the hierarchy of party roles.

14. The apparatus according to claim 10, wherein the processing circuit when executing the instructions is configured to allocate NS instance information from the NFVO.

15. The apparatus according to claim 10, wherein the virtual object comprises any one of: a virtual link, a VNF, a VNF component, a VNF component instance, virtual machine image, a virtual storage, vTap and vFEP.

16. The apparatus according to claim 10, wherein the resource comprises storage resource or a virtual link.

\* \* \* \* \*